United States Patent
Ward

(10) Patent No.: US 10,757,925 B1
(45) Date of Patent: Sep. 1, 2020

(54) OSCILLATING FISHING LURE

(71) Applicant: Steven Ward, Elizabethton, TN (US)

(72) Inventor: Steven Ward, Elizabethton, TN (US)

(*) Notice: Subject to any disclaimer, the term of this patent is extended or adjusted under 35 U.S.C. 154(b) by 0 days.

(21) Appl. No.: 16/792,607

(22) Filed: Feb. 17, 2020

Related U.S. Application Data

(63) Continuation-in-part of application No. 16/689,372, filed on Nov. 20, 2019, now abandoned.

(60) Provisional application No. 62/892,151, filed on Aug. 27, 2019, provisional application No. 62/882,639, filed on Aug. 5, 2019, provisional application No. 62/807,733, filed on Feb. 19, 2019.

(51) Int. Cl.
*A01K 85/02* (2006.01)
*A01K 85/16* (2006.01)

(52) U.S. Cl.
CPC ............ *A01K 85/16* (2013.01); *A01K 85/02* (2013.01)

(58) Field of Classification Search
CPC ......... A01K 85/02; A01K 85/16; A01K 85/18
USPC ................. 43/42.02, 42.36, 42.39, 42.72
See application file for complete search history.

(56) References Cited

U.S. PATENT DOCUMENTS

| | | | | |
|---|---|---|---|---|
| 155,266 A * | 9/1874 | Sprague | ................. | A01K 91/10 43/15 |
| 1,296,057 A * | 3/1919 | Ellsworth | .............. | A01K 91/06 43/42.72 |
| 1,444,876 A * | 2/1923 | Hanson | .................... | F16G 15/08 59/95 |
| 2,690,026 A * | 9/1954 | King | ...................... | A01K 85/00 43/42.02 |
| 2,731,758 A * | 1/1956 | Coe | ......................... | A01K 91/06 43/42.72 |
| 3,151,414 A * | 10/1964 | Hoerner | ................. | A01K 95/00 43/44.97 |
| 3,376,663 A * | 4/1968 | Amrine | .................. | A01K 85/16 43/42.02 |
| 3,399,483 A * | 9/1968 | Naffziger | ............... | A01K 83/06 43/44.4 |
| 3,786,587 A * | 1/1974 | Niileksela | .............. | A01K 85/02 43/35 |
| 4,117,619 A * | 10/1978 | Stevenson | .............. | A01K 95/00 43/43.1 |
| 4,242,827 A * | 1/1981 | Smith | ..................... | A01K 85/16 43/42.1 |
| 4,679,349 A * | 7/1987 | Birchfield | .............. | A01K 95/00 43/44.97 |
| 4,748,763 A * | 6/1988 | Giraudo | ................. | A01K 97/24 43/17.2 |
| 4,843,755 A * | 7/1989 | Lin | ........................ | A01K 91/06 43/42.72 |

(Continued)

OTHER PUBLICATIONS

Mexichem data sheet for VESTOLIT G 121A (120 Series) Polyvinyl Chloride Homopolymer.

(Continued)

*Primary Examiner* — David J Parsley
(74) *Attorney, Agent, or Firm* — Kenneth C. Spafford

(57) ABSTRACT

A lure with an embedded spring is disclosed. The lure has an elastomeric body that is elongated. A coiled wire spring is embedded along the majority of the length of the lure body. The body and spring collectively have negative buoyancy in water. The lure oscillates horizontally when sinking in water, and twitches and wiggles when pulled upward in water, thus continuously mimicking live bait.

3 Claims, 5 Drawing Sheets

(56) References Cited

U.S. PATENT DOCUMENTS

| | | | | |
|---|---|---|---|---|
| 4,982,524 | A * | 1/1991 | Vissing | A01K 97/24 43/17.2 |
| 5,388,367 | A * | 2/1995 | Rydell | A01K 83/00 43/42.1 |
| 7,254,917 | B2 * | 8/2007 | Brickett | A01K 91/06 43/42.02 |
| 9,615,553 | B2 | 4/2017 | Coniglio | |
| 9,839,209 | B2 * | 12/2017 | Nelson, Jr. | A01K 83/06 |
| 10,104,887 | B2 | 10/2018 | Wilson | |
| 2004/0016171 | A1 * | 1/2004 | Waxmanski | A01K 91/10 43/15 |
| 2015/0250154 | A1 * | 9/2015 | Hamaguchi | A01K 85/00 43/42.1 |

OTHER PUBLICATIONS

Material Safety data sheet for Di-Isononyl Phthalate (DINP).
ERGON Safety Data Sheet for HyPrene 60.

\* cited by examiner

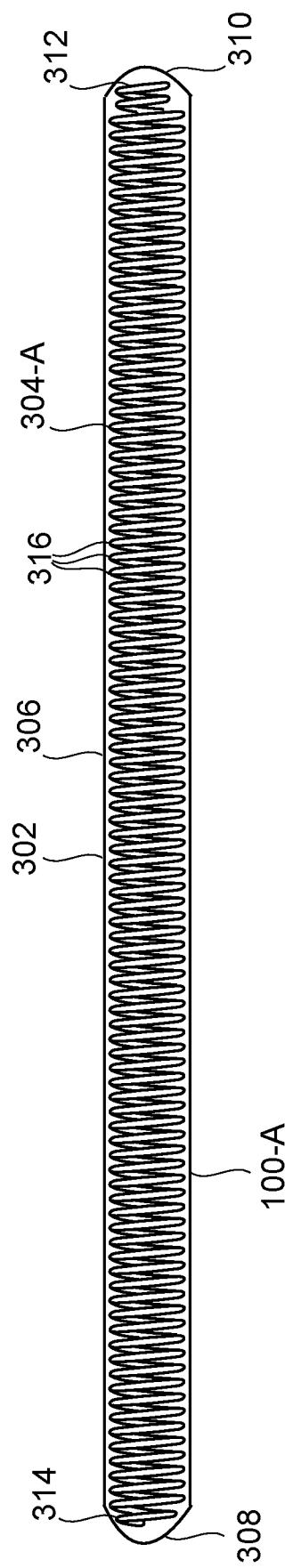
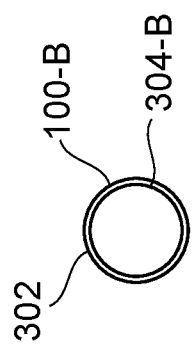
Fig. 3
Fig. 4

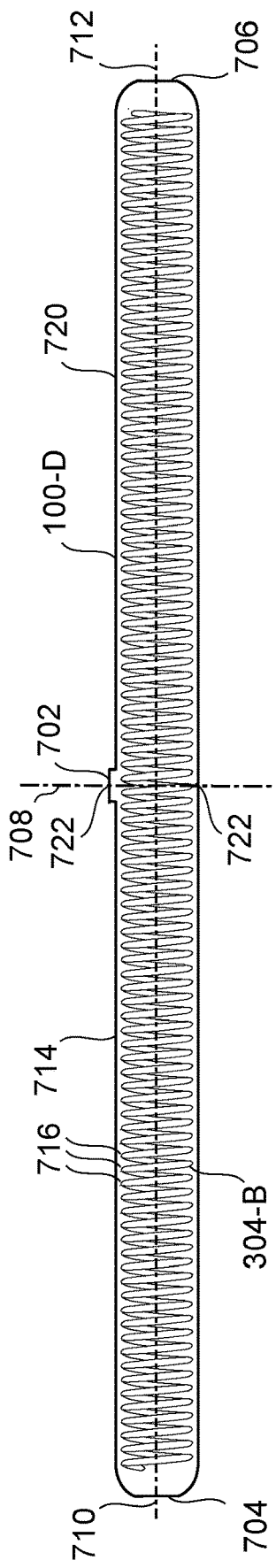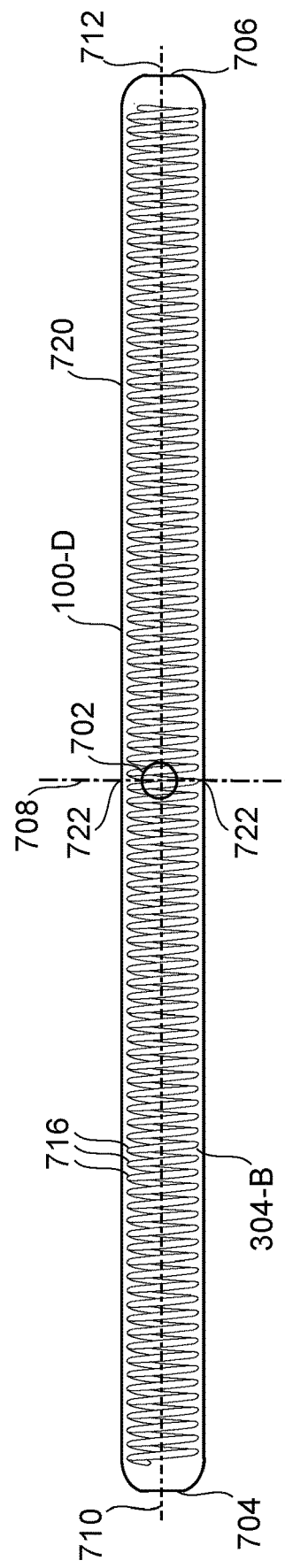

OSCILLATING FISHING LURE

CROSS-REFERENCE TO RELATED APPLICATIONS

This application is a continuation-in-part of U.S. patent application Ser. No. 16/689,372, filed Nov. 20, 2019, which claims the benefit of U.S. Provisional Patent Application Nos. 62/892,151 filed on Aug. 27, 2019; 62/882,639 filed on Aug. 5, 2019; and 62/807,733 filed on Feb. 19, 2019.

STATEMENT REGARDING FEDERALLY SPONSORED RESEARCH OR DEVELOPMENT

Not applicable.

BACKGROUND

1. Field of Invention

This invention pertains to fishing lures. Specifically, this invention pertains to a soft body lure that oscillates horizontally when sinking in water.

2. Description of the Related Art

The goal of artificial lures is to mimic live bait. Most soft plastic lures rely upon some form of twirl, paddle tail, or whipping action to entice fish to bite. Most lure action relies upon continual pulling on the lure through reeling or through movement of the angler's rod. In addition, soft plastic baits are usually weighted with a lead or tungsten weight in front of the lure, which makes the lure appear less realistic. Large conspicuous fishhooks are often required for soft bait because small hooks will not secure the soft bait well enough.

Representative soft bait is described in U.S. Pat. No. 10,104,877 by Wilson, titled "Expanding or contracting fishing lure" ("Wilson"). Wilson teaches an accordion-shaped soft bait that has a hollow center. Water flows though the center of the bait and extends the accordion when the bait is reeled or jiggled by the angler. The bait contracts when the angler ceases reeling. While Wheeler's bait may serve its intended purpose, it does not mimic live bait when the angler is not pulling on the bait, nor does it wiggle laterally of its own accord. In addition, the embodiments disclosed by Wheeler require at least four separate manufactured components.

Another representative soft bait is described in U.S. Pat. No. 9,615,553 by Coniglio, et al. titled "Artificial fishing lure" ("Coniglio"). Coniglio teaches a soft bait with clear, stiff adjustable plastic control planes in each body segment to generate lifelike swimming motions when the bait is reeled in or sinks. Like Wilson, Coniglio requires multiple components, and requires tweaking of the control planes depending upon the water conditions, densities and temperatures. Coniglio also requires weights for most embodiments, which takes away from the realism of the bait.

BRIEF SUMMARY

According to one embodiment of the present invention, a bait is provided. The bait includes a soft body with a spring embedded inside the body. The body is made of a soft plastic such as plastisol. The body is transparent. The body is cylindrical with tapered ends, essentially in the shape of an earthworm.

The embedded spring is a coiled wire in the shape of a helix with a uniform outer diameter. The spring is completely embedded in the body and extends along the main body portion between the distal ends. The spring is visible through the body and mimics the ribbed appearance of an earthworm.

The body is sufficiently soft enough to allow an ordinary steel fish hook to pierce and exit the body. The fish hook is threaded under one or more turns of the spring in order to secure the hook to the bait.

The spring and body collectively have a negative buoyancy in water. When cast into the water, the lateral flexibility of the spring induces a horizontal oscillation of the bait while the bait is sinking. When the bait is pulled up by the angler, the spring causes the bait to twitch and wiggle. Thus, the bait is configured to always be in motion whether sinking or rising, thereby increasing the bait's realism and time in the strike zone.

BRIEF DESCRIPTION OF THE DRAWINGS

FIG. 2 illustrates an embodiment of the invention being reeled in.

FIG. 3 is a side view of an embodiment of the invention.

FIG. 4 is a front view of another embodiment of the invention.

FIG. 7 is a side view of another embodiment of the invention.

FIG. 8 is a top view of the embodiment of FIG. 7.

DETAILED DESCRIPTION

An apparatus for baiting and catching fish is disclosed. The bait is generally indicated as 100, with particular embodiments and variations shown in the figures and described below having an alphabetic suffix, for example, 100-A. Various components are illustrated both generically and specifically in the figures and in the following description. For example, the springs 304-A, 304-B are discussed individually and separately to ensure clarity when describing the configuration of each spring 304-A, 304-B. The spring 304, when referred to collectively, is referenced without the alphanumeric suffix.

Figure 1:
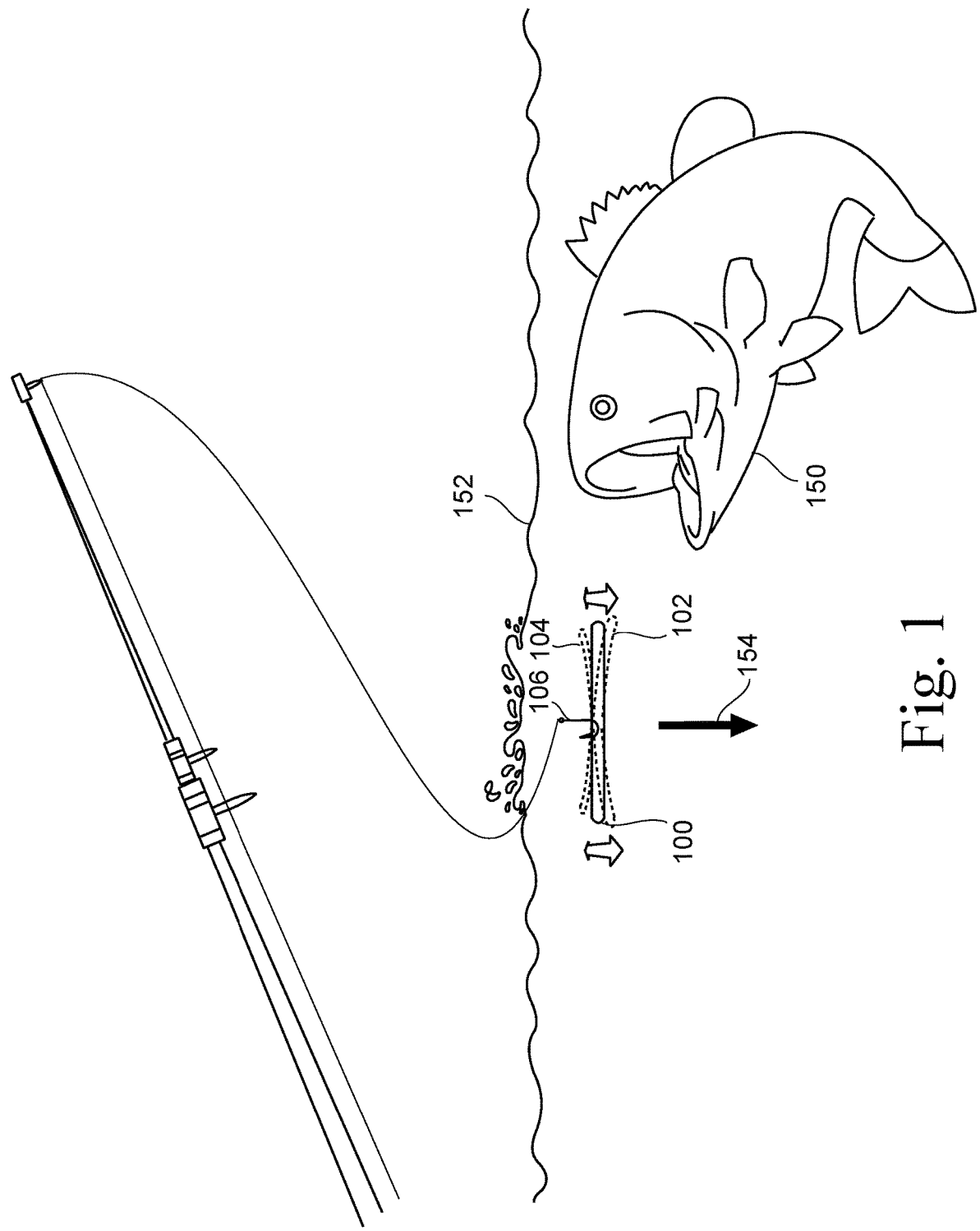
FIG. 1 illustrates an embodiment of the invention sinking in water after being cast into the water.

FIG. 1 illustrates the bait 100 attached to a hook 106. The bait 100 has been cast into the water 152 and is sinking downward 154. While sinking, the bait 100 has the unexpected result of oscillating side-to-side horizontally between u-shaped positions 102 and 104. The oscillation mimics the action of live bait and attracts the attention of fish 150.

Figure 2:
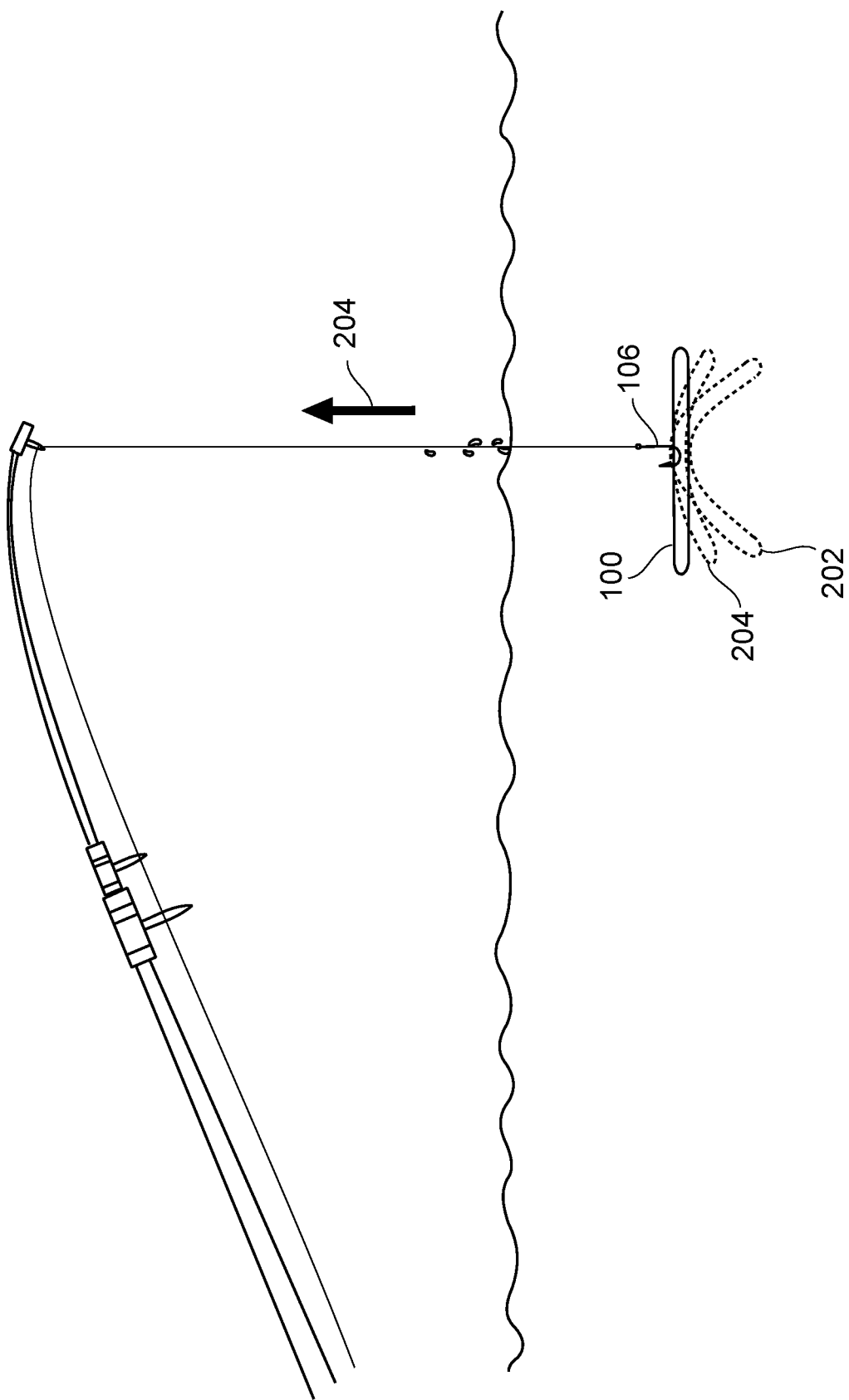

FIG. 2 illustrates the bait 100 being pulled upward 206 in the water. When pulled upward, the bait 100 oscillates, wiggles, and twitches between positions such as 202, 204. The change in positions between 202, 204 and the rest position at 100 mimics the actions of live bait. Thus, the bait always moves to mimic live bait whether sinking or rising in the water 152, thereby increasing the realism of the bait 100 and the strike zone duration for the bait 100.

FIG. 3 illustrates a side view of an embodiment 100-A of the bait 100. The bait 100-A is essentially in the shape of an earthworm, that is, elongated and cylindrical without necessarily including highly detailed earthworm features such as a clitellum or sharpened anterior. The bait 100-A is geometrically in the shape of an elongated capsule. The bait 100-A includes a body 302 whose main portion 306 is cylindrical, elongated, and has a uniform diameter. The main portion 306 of the body 302 is contiguous with rounded distal ends 308, 310. The rounded distal ends 308, 310 are tapered such that the entire body 302 visually mimics real bait such as an earthworm. The bait 100-A is solid, such that the spring 304-A is completely enclosed in the soft plastic of the body 302.

In one embodiment, the body 302 includes accessories, such as eyes, weights, rattles, beads, spinners, floatation chambers, scents or fish attractants, weedless hooks, tinsel, and tied material. In one embodiment, the body 302 includes enhancements such as segments, ridges, or ringlets to further mimic the shape of an worm.

The body 302 is made of a rubber or soft plastic, such as plastisol. In one embodiment, the soft plastic is ordinary plastisol with a clear vinyl formula that has a negative buoyancy in water 152. In another embodiment, the plastisol is a floating formula, which causes that bait 100-A to sink more slowly in the water 152 than bait 100-A made of ordinary plastisol. In another embodiment, the body 302 is tinted to mimic the color of live bait. In another embodiment, the body 302 is opaque. The body 302 is of sufficient softness to be pierced by an ordinary fish hook 106 made of steel. The body 302 can be manufactured from a variety of plastics that are commonly used in the lure manufacturing industry, including plastics with different buoyancy characteristics. The body 302 can be manufactured in any color, or combination or colors, with or without glitters or flakes.

The bait 100 is not limited to a specific ratio of materials or combination of lengths, weights, diameters, or proportions. The bait 100 can be manufactured in a variety of lengths or diameters. The geometry of the bait 100 can be modified to create various appearances.

The spring 304-A is embedded inside the body 302. The spring 304-A is in a rest position when the body 302 is molded to surround the spring 304-A. The spring 304-A is made of a material capable of absorbing and releasing kinetic and potential energy in accordance with Hooke's Law when shaped into a spring and temporarily deformed from its rest state. The bait 100 can be manufactured by injection molding, spin casting, hot dipping, or other methods used in the manufacture of plastic baits.

In one embodiment, the spring 304-A is made of tempered steel. The material for the spring 304-A does not need to be rust-proof. The spring 304-A is embedded completely in the body 302 and is therefore not subject to rust or corrosion from water 152. The spring 304 can be made from a variety of materials, including spring steel, stainless steel, music wire, coated or plated wire, copper, brass, nickel, carbon, titanium, plastic, or any other material used for spring manufacture. The wire from which the spring 304 is made can be round, flat, or rectangular.

The spring 304-A extends along the entire main portion 306 of the body 302. The spring 304-A is helical. The axis of the helical spring 304-A is parallel to the cylindrical axis of the body 302. In one embodiment, the spring 304-A is centered in the body 302 such that the axes of the spring 304-A and the body 302 are coaxial.

In another embodiment, the spring 304 is a flexible elongated strip of metal. The spring coils 316 have a uniform outer diameter along the entire main portion 306 of the body 302. The spring 304-A has a reduced outer diameter at distal end 314, 312 such that the spring ends 314, 312 do not poke outside the body 302 at the tapered distal ends 308, 310.

The body 302 and spring 304-A collectively have a negative buoyancy in water, allowing the bait 100-A to be easily cast, and to sink without adding weights.

In one embodiment, the length of the body 302 is 4.75 inches, and the length of the spring 304-A is 4.625 inches. The diameter of the body main portion 306 is 0.265 inches. The spring 304-A has an outer diameter of 0.188 inches. The wire in the spring 304-A has a diameter of 0.016 inches, and the spacing between each turn 316 in the spring is 0.012 inches, such that the wire thickness is greater than the spacing between each turn 316 in the spring 304-A. The wire in the spring 304-A is music wire. The wire in the spring 304-A has 32 turns per inch. The body 302 is made of a plastisol created from Di-Isononyl Phthalate (2, 5-Furanedione); distillates (petroleum) hydrotreated light naphthenic, under the brand name Ergon HyPrene 60; and a powdered resin polyvinyl chloride homopolymer, under the brand name Vestolit G 121A (120 Series). The body 302 has a Shore A durometer hardness rating ranging from 2 to 5. The body 302 has a specific water gravity ranging from 0.95 to 0.99.

The horizontal oscillation of the bait 100 while sinking is enabled by certain ratios between the length and diameter of the body 302, the length, wire thickness, and outer diameter of the spring 304, and the number of turns per inch of the coils 316. In one embodiment, the ratio of the length of the body 302 to the diameter of the main body portion 306 ranges from 18.5:1 to 17.5:1. In one embodiment, the ratio of the diameter of the main body portion 306 to the outer diameter of the spring coils 316 ranges from 1.3:1 to 1.5:1. In one embodiment, the ratio of the outer diameter of the spring coils 316 to the thickness of the wire ranges from 12:1 to 11:1. In one embodiment, the ratio of the length of the body 302 to the length of the embedded spring 304 ranges from 1.04:1 to 1.02:1. In one embodiment, the weight of the bait 100 ranges from 5.9 grams to 6.1 grams. In one embodiment, the ratio of the length of the spring 304 to the outer diameter of the spring 304 ranges from 24:1 to 25:1.

In another embodiment, the length of the body 302 is 5.75 inches, and the length of the spring 304-A is 5.625 inches. The bait 100 weights 0.380 ounces. The diameter of the body main portion 306 is 0.3125 inches. The spring 304-A has an outer diameter of 7/32 inches. The wire in the spring 304-A has a thickness diameter of 0.022 inches. The wire in the spring 304-A is music wire. The wire in the spring 304-A has 25 turns per inch.

The spring 304-A is visible through the body 302 and visually mimics the segments on live bait such as a worm. In other embodiments, the dimensions of the body 302 and spring 304 can be modified to obtain a subtle or more pronounced action depending on the intended application of the lure. In other embodiments, the bait 100 is in the shape of a worm, baitfish, lizard, eel, or other prey of fish.

In another embodiment, the spring 304 is not a coil but a strip of spring material. The spring 304 facilitates a very lifelike wiggling action when being pulled or twitched, and creates the appearance of a struggle to swim as it falls to the bottom.

FIG. 4 is a front view of another embodiment 100-B of the bait 100. The spring 304-B has a uniform outer diameter and does not include the spring ends 312, 314 with a lesser outer diameter.

Figure 5:
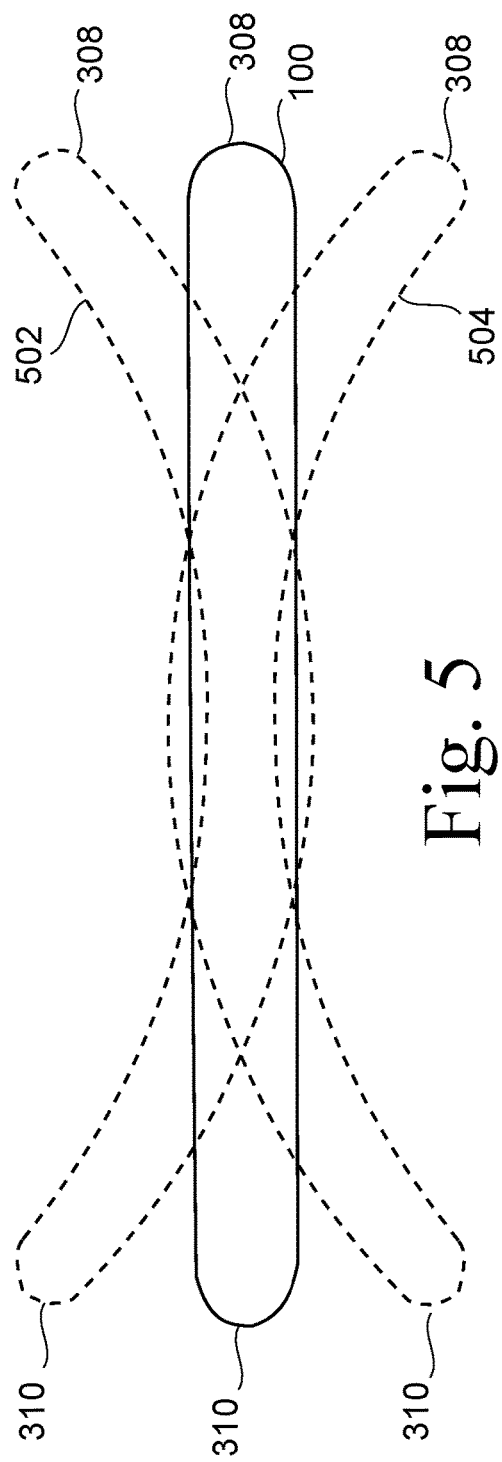
FIG. 5 is a top view of an embodiment of the invention in horizontal motion while sinking in the water.

FIG. 5 illustrates a top view of the bait 100 oscillating as it is sinking vertically through water 152, for example as shown in FIG. 1. The bait 100 creates a wiggling effect when falling, such that the bait oscillates between u-shaped positions 502 and 504. The positions 502, 504 are parabolic, overlapping, and symmetrical. Although water currents and the falling of the bait 100 may create slight vertical movements, the oscillation between positions 502 and 504 is essentially horizontal and appears horizontal to an observer.

The oscillation is not caused by the conventional compressing or stretching of the spring 304, for example by applying directly opposing forces to the distal ends 312, 314 of the spring 304. The oscillation is also not caused by torsion of the spring 314. Rather, the lateral flexibility and resilience of the spring 304 facilitates the swimming type action. The combination of the spring 304 and the plastic in the body 302 give the bait 100 the correct proportions to allow the horizontal oscillation to continue as the bait free falls in the water. The combination of the spring 304 and the plastic in the body 302 also allows the bait to twitch and wiggle when pulled upward through the water.

Figure 6:
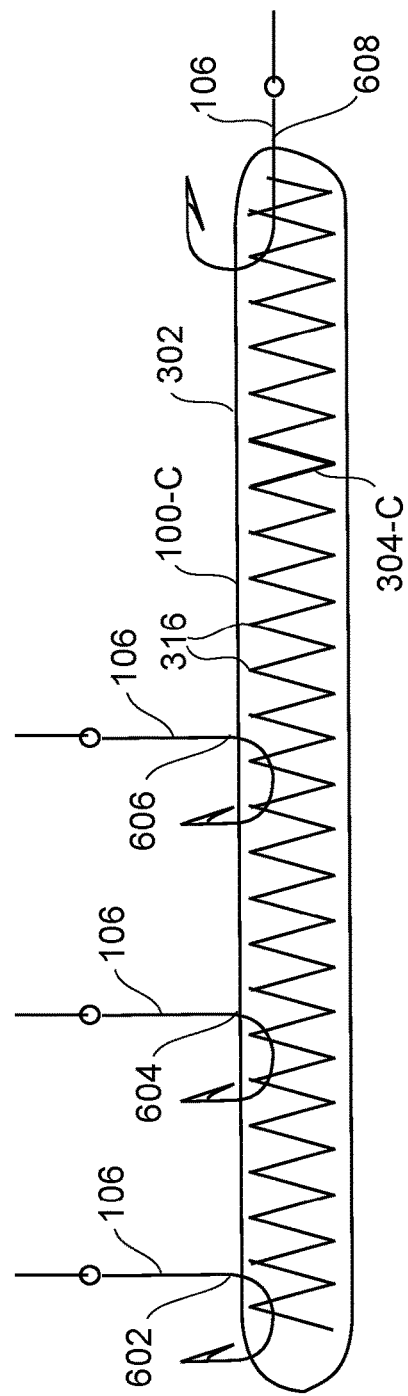
FIG. 6 is a side view of another embodiment of the invention with inserted fish hooks.

FIG. 6 illustrates various non-exclusive positions for a hook 106 to be inserted into the bait 100-C. The hook 106 is secured by being fed into the body 302 and passing under one or more turns 316 of the spring 304-C before exiting the body 302 again. The hooked spring turns 316 secure the hook 106 and prevent the hook 106 from ripping out of the soft body 302. The elastic and resilient nature of the body 302 causes the body 302 to press against the hook 106 and prevent it from sliding out of the bait 100-C. The hook 106 attached at the middle 606 or at 604 will cause the bait 100-C to oscillate horizontally when the bait 100-C is cast into and lowered down through water 152. The hook 106 is also attachable at the end 608 such that the bait 304-C is lowered vertically into the water 152, which will cause the bait 100-C to exhibit different wriggling and twitching motions than the motion disclosed in FIG. 5.

FIG. 7 illustrates a side view of another lure embodiment 100-D, and FIG. 8 illustrates a top view of the lure embodiment 100-D. The lure 100-D is solid. The spring 304-B is sealed and embedded in the body 714.

In one embodiment, the body 714 is an elastomer. The body 714 includes a main body section 702, a protrusion 702, and two opposing distal ends 704, 706. The main body section 720 is cylindrical and has a uniform diameter. The main body section 720 has a center axis 710 along the elongated dimension of the main body section 720.

A protrusion 702 extends from a transverse plane 708 that is at the midpoint 722 of the main body section 720. In the displayed embodiment, the midpoint 722 of the elongated dimension of the main body section 702 is also the midpoint for the whole lure 100-D along its longest dimension. The protrusion 702 is a result of a molding process wherein the body 714 material is injected at the midpoint such that the material flows toward both the opposing distal ends 704, 706 at the same time and rate. The symmetrical flow prevents the spring 304-B from drifting or collapsing in the mold from the pressure of the material flowing into the mold.

The protrusion 702 is a marker for inserting a hook 606 at the midpoint 722, for example, as shown in FIG. 6 at 606. Fastening the hook at the midpoint 722 is known as a "wacky rig." When hooked at the midpoint 708, the lure 100-D is balanced when suspended from a fishing line attached to the hook 106. When hooked at the midpoint 722, the lure 100-D will oscillate when sinking in water 152.

The spring 304-B is completely embedded inside the body 714. The spring 304-B is made of metal wire. The spring 304-B is in the shape of a helix. The spring 304-B has a helical center axis 712. The main body section 720 center axis 710 and the spring helical center axis 712 are coaxial. The spring 304-B is elongated along its helical axis 712. The body 714 is elongated along the main body section axis 710.

The spring 304-B extends along at least 80 percent of the body 714. The spring 304-B has a plurality of helical turns 716. The spring 304-B has at least 20 turns per inch. The diameter of each turn 716 in the main body section 720 is a least 80% of the cylindrical diameter of the main body section 720. The spring 304-B extends along at least 90 percent of the main body section 720.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

I claim:

1. A fishing lure, comprising:
   an elongated body comprised of a first material, said first material is an elastomer, said first material is translucent, said body has an elongated dimension, said elongated dimension has an axis centered along said elongated dimension;
   a spring completely embedded in said body, said spring is coiled, said spring is helical, said spring has a helix axis centered along said helix, said helix axis is parallel and coaxial with said axis of said elongated dimension of said body, said spring extends along more than 80 percent of said elongated dimension of said body, said spring is made of metal wire, said spring has at least 20 turns per inch;
   said spring includes a first distal helix turn and a second distal helix turn on opposing ends of said spring, said first and second distal helix turns each have an outer diameter perpendicular to said helix axis not greater than said first diameter of said spring section;
   said elongated dimension of said body includes a first body section that is at least 80 percent of the greatest length of said elongated dimension of said body;
   said spring includes a first spring section that extends along said first body section such that said first spring section is at least 80 percent of the greatest length of said elongated dimension of said body, said first spring section's entire outer surface is visible from outside said body;
   all of said first spring section has a first diameter perpendicular to said helix axis, all of said first body section has a first width perpendicular to said axis of said elongated dimension of said body, said first diameter is at least 80 percent of said first width;
   wherein said first material is sufficiently soft to be pierced by an end of a steel fish hook, and wherein said turns of said spring are sufficiently spaced to allow the steel fish hook to pass under one or more turns until the end of the hook end is exposed;
   said lure is completely solid such that all interior of said lure is completely filled up collectively with said spring and said first material; and
   said lure has a negative buoyancy in water.

2. A fishing lure, comprising:
   a body comprised of plastisol, said body has a main section, a protrusion, and two opposing distal ends, said main section is directly adjacent to said two opposing distal ends, said main section of said body is in the shape of an elongated cylinder with a consistent diameter, said protrusion is at the transverse plane midpoint of said main body section and protrudes from said main body section;

a spring comprising a spring section, said spring section extends along at least 90 percent of said main section of said body, said spring is embedded inside said body, said spring is made of metal wire, said wire is completely inside said body, said spring is helical, said spring section has a consistent diameter, said spring section diameter is at least 80 percent of said main section diameter;

said lure is configured to be fastened to a fish hook at the midpoint of said main body section, such that a sharp end of the fish hook passes into said body, then underneath and across at least one turn of said spring before exiting said lure;

said lure has a negative buoyancy in water;

said lure is solid, said lure is free of cavities, said lure consists of said spring and said body, said body consists essentially of said plastisol; and said lure is configured to oscillate horizontally in water when fastened to a fish hook at the midpoint of said main body section and sinking in water.

3. A fishing lure, comprising:

a spring completely sealed inside a body;

said body comprises a first material, said first material is an elastomer, said first material has Shore A durometer hardness rating between 2 and 5, said first material is waterproof;

said body is elongated, wherein the greatest length of said body is a first length, said body has a main body section that is elongated and has a second length, wherein said second length is at least 80 percent of said first length;

said spring has a main spring section that extends along said main body section such that said spring is at least 80 percent of said first length;

said main spring section is in the shape of a helix such that said main spring section has a plurality of helix turns, said main spring section has a consistent helix diameter;

said first material is directly between each pair of adjacent helix turns in said plurality of helix turns in said main spring section;

said main spring section has a first center axis, said main body section has a second center axis, said first and second center axes are coaxial;

said lure's outer surface is made entirely of said first material;

all outer surfaces of said main spring section are contiguous with said first material;

said lure includes no empty spaces;

said first material has a negative buoyancy in water; and said lure is configured to oscillate horizontally and bend in alternating symmetrical parabolic shapes when sinking in water.

* * * * *